United States Patent Office 3,019,267
Patented Jan. 30, 1962

3,019,267
THIOLS OF BICYCLO[2.2.1]HEPTA-2,5-DIENE AND METHOD OF PREPARATION
John E. Mahan and Rector P. Louthan, Bartlesville, Okla., assignors to Phillips Petroleum Company, a corporation of Delaware
No Drawing. Filed Mar. 26, 1959, Ser. No. 802,030
7 Claims. (Cl. 260—609)

This invention relates to novel thiols which can be obtained from bicyclo[2.2.1]hepta-2,5-diene. The invention also relates to a method of preparing the said thiols. In one of its aspects, the invention relates to at least the following compounds:

5-mercaptobicyclo[2.2.1]heptene-2
2,5-dimercaptobicyclo[2.2.1]heptane
2,6-dimercaptobicyclo[2.2.1]heptane In another of its aspects, the invention relates to a method of preparing at least the said listed compounds by reaction of bicyclo[2.2.1]hepta-2,5-diene with hydrogen sulfide employing ultraviolet light or equivalent radiation.

The thiols or mercaptans of the invention can be represented by the following structural formulas:

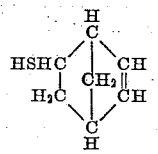  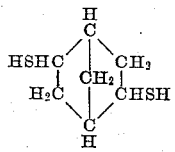

5-mercaptobicyclo[2.2.1]heptene-2    2,5-dimercaptobicyclo[2.2.1]heptane
I                                     II and

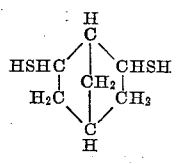

2,6-dimercaptobicyclo[2.2.1]heptane
III

The dithiols II and III can be converted to desirable polymer by heating a mixture of dithiol with sulfur while adding an amine as further described and as claimed in copending application Serial Number 803,079, filed March 31, 1959, by Rector P. Louthan.

It is an object of this invention to provide new and useful thiols. It is a further object of this invention to provide mono- and dithiols which can be derived from bicyclo[2.2.1]hepta-2,5-diene. It is a further object of this invention to provide at least the following new thiols:

5-mercaptobicyclo[2.2.1]heptene-2
2,5-dimercaptobicyclo[2.2.1]heptane
2,6-dimercaptobicyclo[2.2.1]heptane It is a further object of this invention to provide a method for the preparation of at least the novel thiols herein set forth.

Other aspects, objects and the several advantages of the invention are apparent from a study of this disclosure and the appended claims.

According to this invention, there are provided at least the following new compounds or compositions of matter:

5-mercaptobicyclo[2.2.1]heptene-2
2,5-dimercaptobicyclo[2.2.1]heptane
2,6-dimercaptobicyclo[2.2.1]heptane Further, according to this invention, there is provided a method for the preparation of the said thiols which generally comprises reacting bicyclo[2.2.1]hepta-2,5-diene with hydrogen sulfide in the presence of ultraviolet light to promote the reaction.

The reaction of bicyclo[2.2.1]hepta-2,5-diene with hydrogen sulfide is conveniently effected using 0.25 to 4 mols of the unsaturated hydrocarbon per mol of hydrogen sulfide. The reaction can be effected in the presence of a suitable diluent, if desired, particularly in the case of reactions activated by ultraviolet light. Suitable diluents are, for instance, paraffinic hydrocarbons having 4–16 carbon atoms per molecule such as butanes, pentanes, octanes, decanes, and hexadecanes. The use of such a diluent is not necessary and not preferred. The reaction is usually carried out in the liquid phase. The reaction temperatures are usually in the range of −50 to 200° C., more often in the range from 0 to 100° C., for example, in the range 60–100° C. as indicated by the examples. Preferably, the reaction is promoted by effecting the reaction in the presence of ultraviolet radiation of a wave length less than 3,200 angstroms. The reaction is also promoted by ionizing radiations such as X-rays, gamma rays, beta-rays, and alpha particle rays. The reaction products can be separated by any convenient means. Quite often, distillation is employed to separate the products. Unreacted and separated reactants can, of course, be recycled.

Bicyclo[2.2.1]hepta-2,5-diene is now commercially available. This chemical can be prepared, for example, by the Diels-Alder reaction of cyclopentadiene and acetylene at temperatures of 150–400° C. and pressures of 1 to 250 p.s.i. One specific process for effecting this reaction is described in Belgian Patent 498,176, dated January 15, 1951 [cf. CA 49, 372 (1955)]. Various methods are known to ordinarily effect addition of hydrogen sulfide to olefins. One method is described in U.S. Patents 2,398,479, issued April 16, 1946, to Vaughan et al., wherein ultraviolet light is used to promote the reaction. In copending application Serial Number 777,227, filed December 1, 1958, by Rector P. Louthan, the use of ultraviolet and of ionizing rays is also described. Various other catalytic processes are also well known.

It is noted that isomeric dithiols result from the reaction.

EXAMPLE I

Synthesis of thiols

The reaction of bicyclo[2.2.1]hepta-2,5-diene with hydrogen sulfide was effected in a reactor fabricated from 3-inch stainless steel pipe, approximately 6 inches long. To admit ultraviolet light a quartz tube was sealed axially in the pipe so that the reactants contained in the annular space between the steel pipe and quartz tube could be exposed to the radiations from a 450 watt mercury vapor lamp. The reactor was equipped with a thermowell, a pressure gauge and a cooling coil through which tap water flowed. Inlet tubes with valves were provided in order to charge the reactants.

The reactor was charged with 118 grams of bicyclo[2.2.1]hepta-2,5-diene and 170 grams of hydrogen sulfide. The mixture was irradiated for 30 minutes at temperatures between 64 and 98° C. Unreacted hydrogen sulfide was then vented. The mixture obtained was combined with that obtained from another run using the same conditions. The combined mixtures (350.6 grams) were then fractionated by distillation under reduced pressure so as to obtain 10 cuts.

Analysis of the data indicated the presence of a low boiling fraction, the monothiol, in amount of about 106 grams and a higher boiling fraction, the dithiols, in amount of about 98 grams. Cut No. 1 was taken as representative of the monothiol. It had a boiling range of 71–76° C. at 25 mm. mercury pressure and a refractive index $n_D^{20}$, of 1.5310.

Cut No. 4 amounting to 11.6 grams and having a boiling range of 138–139° C. at 26 mm. mercury pressure and a refractive index, $n_D^{20}$, of 1.5722 was selected as representative of the dithiols. This cut is a mixture of 2,5-dimercaptobicyclo[2.2.1]heptane and 2,6-dimercaptobicyclo[2.2.1]heptane.

The chemical analysis of these portions is compared with the calculated values in the tabulation below. The physical properties, as reported above, are also summarized.

|  | 5-mercaptobicyclo [2.2.1]-heptene-2 | | Mixture of 2,5- and 2,6-dimercapto[2.2.1] heptane | |
|---|---|---|---|---|
|  | Calculated | Found | Calculated | Found |
| Carbon, percent | 66.7 | 66.4 | 53.2 | 52.7 |
| Hydrogen, percent | 7.9 | 7.9 | 6.3 | 7.4 |
| Mercaptan sulfur, percent | 25.4 | 24.9 | 40.5 | 40.6 |
| $n_D^{20}$ | 1.5310 | | 1.5722 | |
| Boiling point | 71–76° C. at 25 mm. | | 138–139° C. at 26 mm. | |

The new compounds or reaction products of this invention possess a strong odor, typical of many thiols, and utility as odorants for a natural gas. Also, the dithiols are particularly useful for the preparation of the polymers which are claimed in copending application Serial Number 803,079, filed March 31, 1959, by Rector P. Louthan.

EXAMPLE II

*Synthesis of polymer*

The dithiols (50 grams) described in Example I were dissolved in 400 ml. of chloroform and mixed with 28.9 grams of flowers of sulfur. The mixture was heated to boiling to effect refluxing of the solvent. To the heated mixture there was added 100 cc. of chloroform containing 4 drops (about 0.2 cc.) of triethylamine. The amine was added slowly over a 10 minute period. During the addition of the amine there occurred a vigorous evolution of hydrogen sulfide. The resulting solution was refluxed for six hours and then allowed to remain at room temperature over the weekend. The solution was poured into one liter of n-pentane whereupon the polymer precipitated. The polymer was recovered by filtration and dried in a vacuum oven at 100° C. for 3 hours. The polymer was a moldable, yet brittle, polymer having a pleasing golden color. The polymer was also transparent.

It will be noted from Example I that the temperatures during the irradiation were in the range 64–98° C. Thus, the examples show a range of 60–100° C. within the overall range given herein.

One manner of proceeding to obtain the products of this invention involves passing bicyclo[2.2.1]hepta-2,5-diene together with hydrogen sulfide through an irradiated reactor tube or other container while slightly heating the same to encourage reaction to get underway and then controlling the temperature of the reaction mass to within a range of temperatures at which the products are obtained.

Reasonable variation and modification are possible within the scope of the foregoing disclosure and the appended claims to the invention the essence of which is that there have been provided at least the novel thiols set forth herein, namely, 5-mercaptobicyclo[2.2.1]heptene-2, 2,5-dimercaptobicyclo[2.2.1]-heptane, and 2,6-dimercaptobicyclo[2.2.1]heptane; and a method for their preparation comprising essentially reaction of bicyclo[2.2.1]hepta-2,5-diene with hydrogen sulfide in the presence of actinic light.

We claim:
1. 5-mercaptobicyclo[2.2.1]heptene-2.
2. 2,5-dimercaptobicyclo[2.2.1]heptane.
3. 2,6-dimercaptobicyclo[2.2.1]heptane.
4. A method of preparing a thiol from bicyclo[2.2.1]hepta-2,5-diene which comprises reacting said compound with hydrogen sulfide in the presence of actinic light and recovering said thiol from the reaction mass thus obtained.
5. A method of preparing a thiol from bicyclo[2.2.1]hepta-2,5-diene which comprises reacting said compound with hydrogen sulfide in the presence of actinic light while maintaining a slightly elevated temperature and recovering said thiol from the reaction mass thus obtained.
6. A method which comprises reacting bicyclo[2.2.1]hepta-2,5-diene with hydrogen sulfide using 0.2–4 mols of said bicyclo[2.2.1]hepta-2,5-diene per mol of hydrogen sulfide, preferably in the presence of a diluent and in the presence of reaction activating rays.
7. A method according to claim 6 wherein the rays are ultraviolet radiation of a wave length less than 3,200 angstroms.

References Cited in the file of this patent
UNITED STATES PATENTS
2,076,875    Borglin et al. _____ Apr. 13, 1937
OTHER REFERENCES
Vaughan et al.: Jour. Organic Chem. 7, 472–476 (1942).
Chemical Abstracts 49, 372 (1955).